(12) United States Patent
Shirouzu

(10) Patent No.: US 10,607,762 B2
(45) Date of Patent: Mar. 31, 2020

(54) REACTOR INCLUDING TUBULAR CORE, MOTOR DRIVE DEVICE, AND AMPLIFIER DEVICE

(71) Applicant: FANUC CORPORATION, Yamanashi (JP)

(72) Inventor: Masatomo Shirouzu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 153 days.

(21) Appl. No.: 15/625,356

(22) Filed: Jun. 16, 2017

(65) Prior Publication Data

US 2017/0372828 A1 Dec. 28, 2017

(30) Foreign Application Priority Data

Jun. 23, 2016 (JP) .................................. 2016-124665

(51) Int. Cl.
*H01F 27/06* (2006.01)

(52) U.S. Cl.
CPC .......... *H01F 27/06* (2013.01); *H02P 2201/00* (2013.01)

(58) Field of Classification Search
CPC ................................................ H01F 27/00–36
USPC ........ 336/65, 83, 90, 92, 180–184, 220–223
See application file for complete search history.

(56) References Cited

U.S. PATENT DOCUMENTS

| 3,210,625 | A | * | 10/1965 | Hesse | .................. B65H 23/198 |
| | | | | | 318/512 |
| 4,338,657 | A | * | 7/1982 | Lisin | ....................... H01F 30/12 |
| | | | | | 336/175 |
| 6,792,666 | B1 | * | 9/2004 | Bolotinsky | ............. H01F 27/25 |
| | | | | | 29/602.1 |
| 9,653,983 | B2 | | 5/2017 | Kurita | |
| 9,899,135 | B2 | | 2/2018 | Nakanoue et al. | |
| 10,008,322 | B2 | | 6/2018 | Bhide et al. | |
| 2011/0115417 | A1 | | 5/2011 | Shimada | |
| 2012/0262969 | A1 | | 10/2012 | Nagano et al. | |
| 2013/0187741 | A1 | | 7/2013 | Goodrich et al. | |
| 2013/0200967 | A1 | * | 8/2013 | Xu | ........................ H01F 27/306 |
| | | | | | 336/5 |
| 2014/0159844 | A1 | | 6/2014 | Suzuki | |
| 2016/0125998 | A1 | | 5/2016 | Bhide et al. | |
| 2017/0047156 | A1 | | 2/2017 | Sakamoto et al. | |
| 2017/0372828 | A1 | | 12/2017 | Shirouzu | |
| 2018/0040407 | A1 | | 2/2018 | Yamamoto et al. | |
| 2018/0122551 | A1 | | 5/2018 | Yoshikawa | |

FOREIGN PATENT DOCUMENTS

| CN | 104471657 A | 3/2015 |
| CN | 206893388 U | 1/2018 |
| DE | 1513862 A1 | 4/1969 |
| DE | 112008003921 T5 | 6/2011 |
| DE | 112015002631 T5 | 3/2017 |

(Continued)

*Primary Examiner* — Tuyen T Nguyen
(74) *Attorney, Agent, or Firm* — RatnerPrestia

(57) ABSTRACT

A reactor capable of eliminating a heat source provided within a power cabinet housing a motor drive device. The reactor includes a tubular core, a coil installed inside the core, a terminal which is provided at an axially first end of the core and which is connected to the coil, and an attachment flange which extends radially outside of the core and which is provided between the terminal and a second end of the core.

5 Claims, 11 Drawing Sheets

(56) References Cited

FOREIGN PATENT DOCUMENTS

| JP | 2001167947 A | 6/2001 |
|---|---|---|
| JP | 2010-130779 | 6/2010 |
| JP | 2011205210 A | 10/2011 |
| JP | 2011254005 A | 12/2011 |
| JP | 2016122830 A | 7/2016 |
| WO | 2014033830 A1 | 3/2014 |
| WO | 2014073252 A1 | 5/2014 |

* cited by examiner

REACTOR INCLUDING TUBULAR CORE, MOTOR DRIVE DEVICE, AND AMPLIFIER DEVICE

BACKGROUND OF THE INVENTION

1. Field of the Invention

The invention relates to a reactor including a tubular core, a motor drive device, and an amplifier device.

2. Description of the Related Art

In a machine tool or industrial machine, a motor drive device (including a converter, an inverter, and a reactor) for driving a motor used for a robot, the reactor disposed between the converter of the motor drive device and a power source is generally installed in a power cabinet.

Peripheral equipment including a motor drive device installed in the power cabinet, or cables generate heat, and accordingly, the internal temperature of the power cabinet reaches 40° C. to 50° C. in some cases. Thus, an air duct for ventilation and a cooler may be provided to prevent the motor drive device or peripheral equipment from excessively generating heat.

The quantity of heat generated from the motor drive device, the peripheral equipment, and the cables in the power cabinet is referred to as the residual heat quantity, and is used as a criterion with reference to which the temperature of the power cabinet in operation is designed so as to remain within a predetermined temperature range.

In many cases, the quantity of heat generated from the motor drive device (including the converter, the inverter, and the reactor) contained in the power cabinet accounts for most of the quantity of heat generated in the power cabinet. However, a heat radiator is provided for the converter and the inverter. Disposing the heat radiator so as to project to the outside of the power cabinet enables drastic reduction of the residual heat quantity.

The reactor is usually disposed within the power cabinet, and does not have a heat radiation means extending to the outside of the power cabinet. Thus, the quantity of heat generated from the reactor accounts for all the residual heat quantity, and contributes to a rise in the temperature of the power cabinet.

This remarkably increases the ratio of the residual heat quantity caused by the reactor to the total residual heat quantity in the power cabinet in proportion to the output of the motor drive device. As a technology for releasing the residual heat generated from the reactor to the outside of the power cabinet, disposing the reactor outside the power cabinet has been known (see, e.g., Japanese Unexamined Patent Publication (Kokai) No. 2010-130779).

Conventionally, a technology for eliminating the heat source within the power cabinet containing the motor drive device has been demanded.

SUMMARY OF THE INVENTION

In an aspect of the invention, a reactor includes a tubular core, a coil provided in the core, a terminal provided at an first end of the core in an axial direction and to which the coil is connected, and an attachment flange extending radially outside of the core and disposed at a position between the terminal and a second end of the core opposite the first end.

The attachment flange may be disposed at a position between the terminal and the first end, or at a position between the first end and the second end to be closer to the first end than the second end. The reactor may further include a sealing section provided at the second end so as to hermetically seal the inside of the core.

The reactor may further include a sealing section provided at an end face of the attachment flange in the axial direction so as to surround the outer surface of the core. The attachment flange is formed with a handle provided so as to project from the attachment flange in the axial direction or a fastening section for fastening an eyebolt.

In another aspect of the invention, a motor drive device includes the above-mentioned reactor. In still another aspect of the invention, an amplifier device includes a hollow power cabinet having a wall formed with a through-hole, and the above-mentioned reactor, wherein the core is disposed in the through-hole so that the second end is exposed to the outside of the power cabinet, while the terminal is located inside of the power cabinet, and the attachment flange is fixed to the wall so as to close the through-hole.

BRIEF DESCRIPTION OF THE DRAWINGS

The above-mentioned or other objects, features, and advantages of the invention will be clarified from the detailed description of embodiments shown in the accompanying drawings, in which.

DETAILED DESCRIPTION

Figure 1:
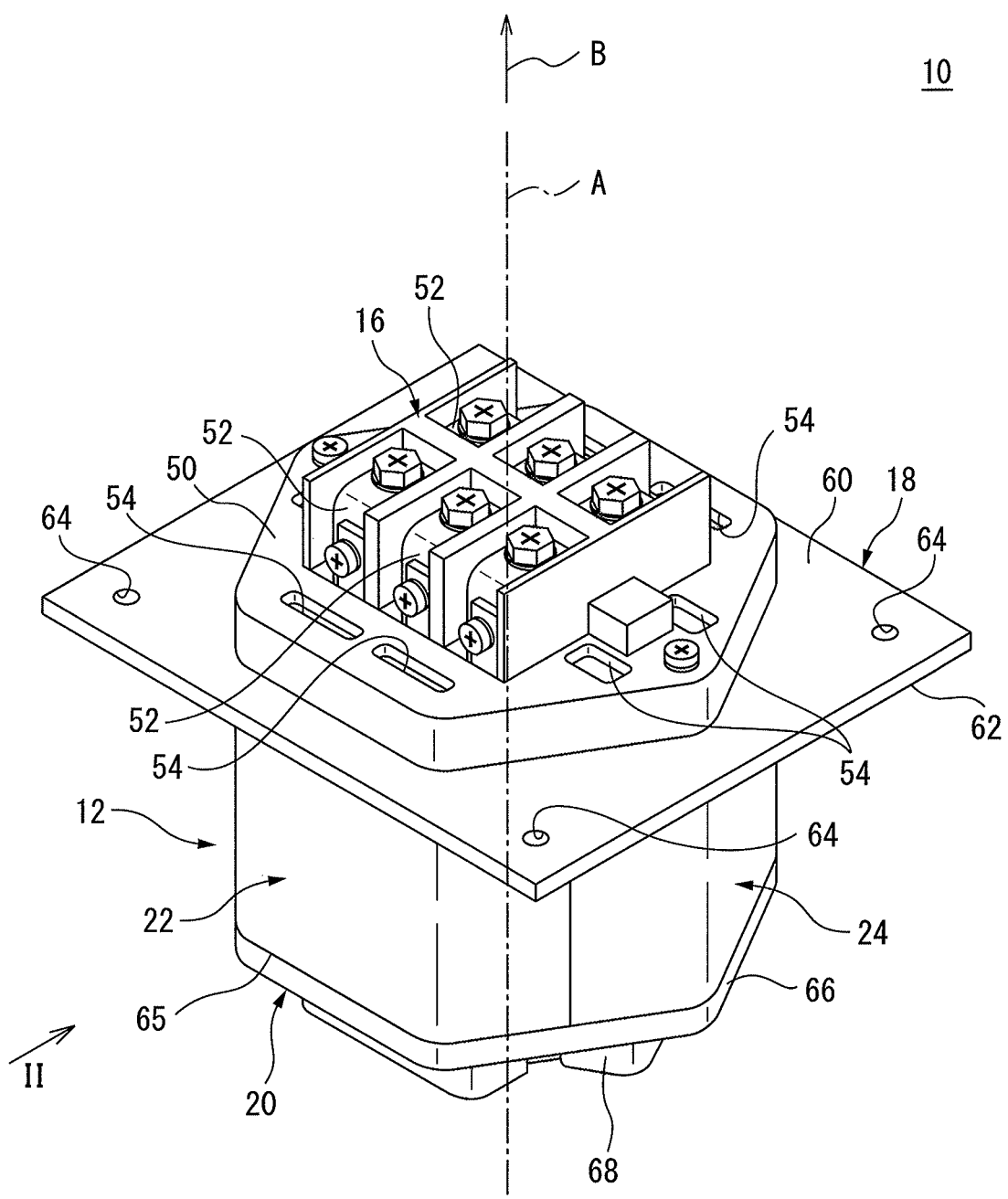
FIG. 1 is a perspective view of a reactor according to an embodiment.
Figure 2:
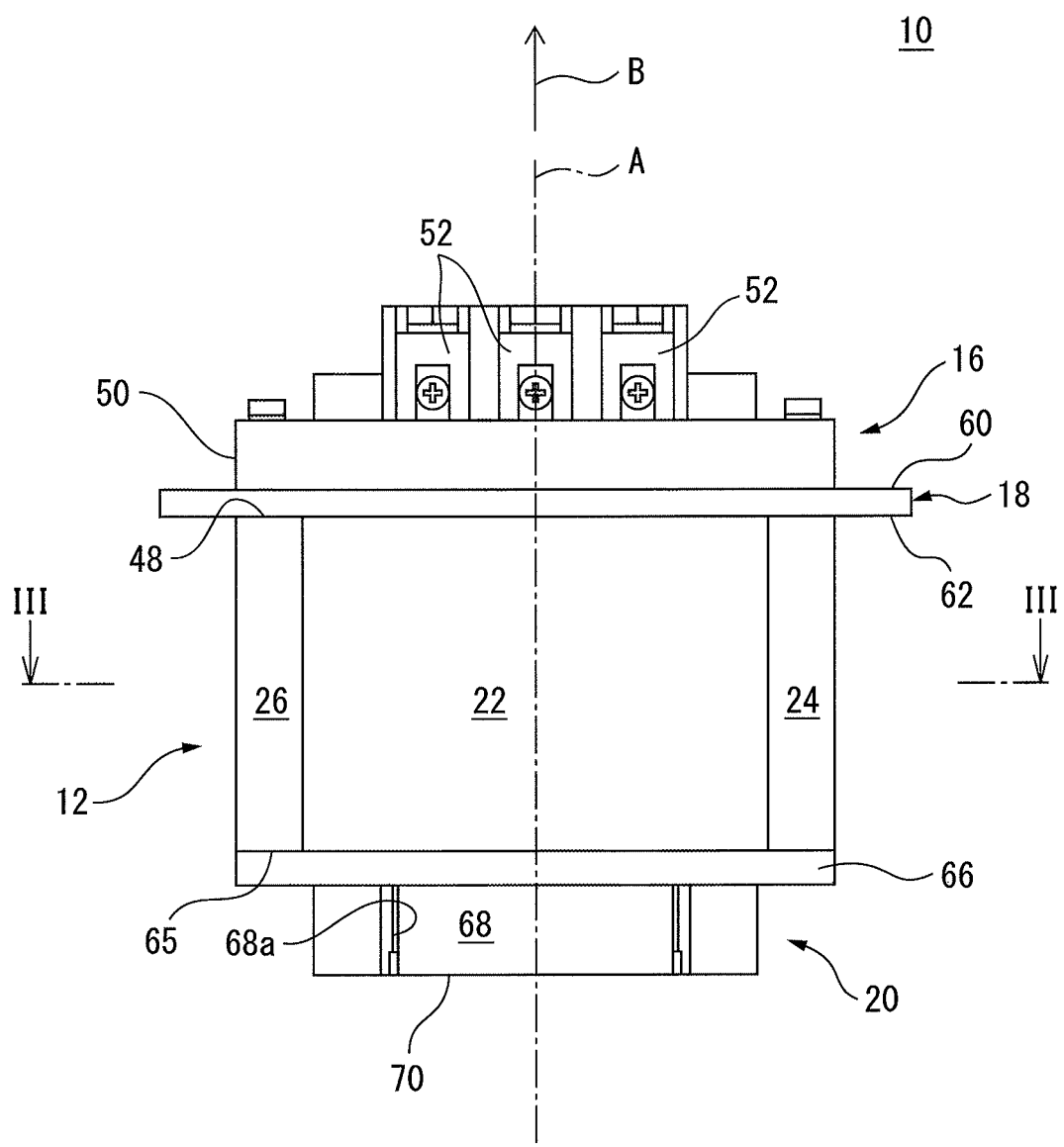
FIG. 2 is a side view of the reactor shown in FIG. 1 when seen from arrow II in FIG. 1.

Embodiments of the invention will be described below with reference to the drawings. Note that, in various embodiments described below, similar elements are assigned the same reference numerals, and overlapping descriptions will be omitted. First, with reference to FIGS. 1 to 4, a reactor 10 according to an embodiment will be described.

Note that, the axial direction in the following description represents a direction along a center axis A of a core 12 of the reactor 10. Further, the radial direction represents a direction of radius of a circle centered about the axis A, and the circumferential direction represents the circumferential direction of the circle. Further, for the sake of convenience, the direction indicated by an arrow B in the drawings is referred to as the axially upward direction.

The reactor 10 is e.g. an alternating-current (AC) reactor, and includes the core 12, coils 14, a terminal block 16, an attachment flange 18, and a cover 20. The core 12 is configured by laminating a plurality of magnetic steel sheets in the axial direction.

The core 12 may be made of a magnetic material, such as ferrite, powder magnetic core, or amorphous. The core 12 is tubular, and includes a plurality of core segments 22, 24, and 26 arranged so as to align in the circumferential direction.

Figure 3:
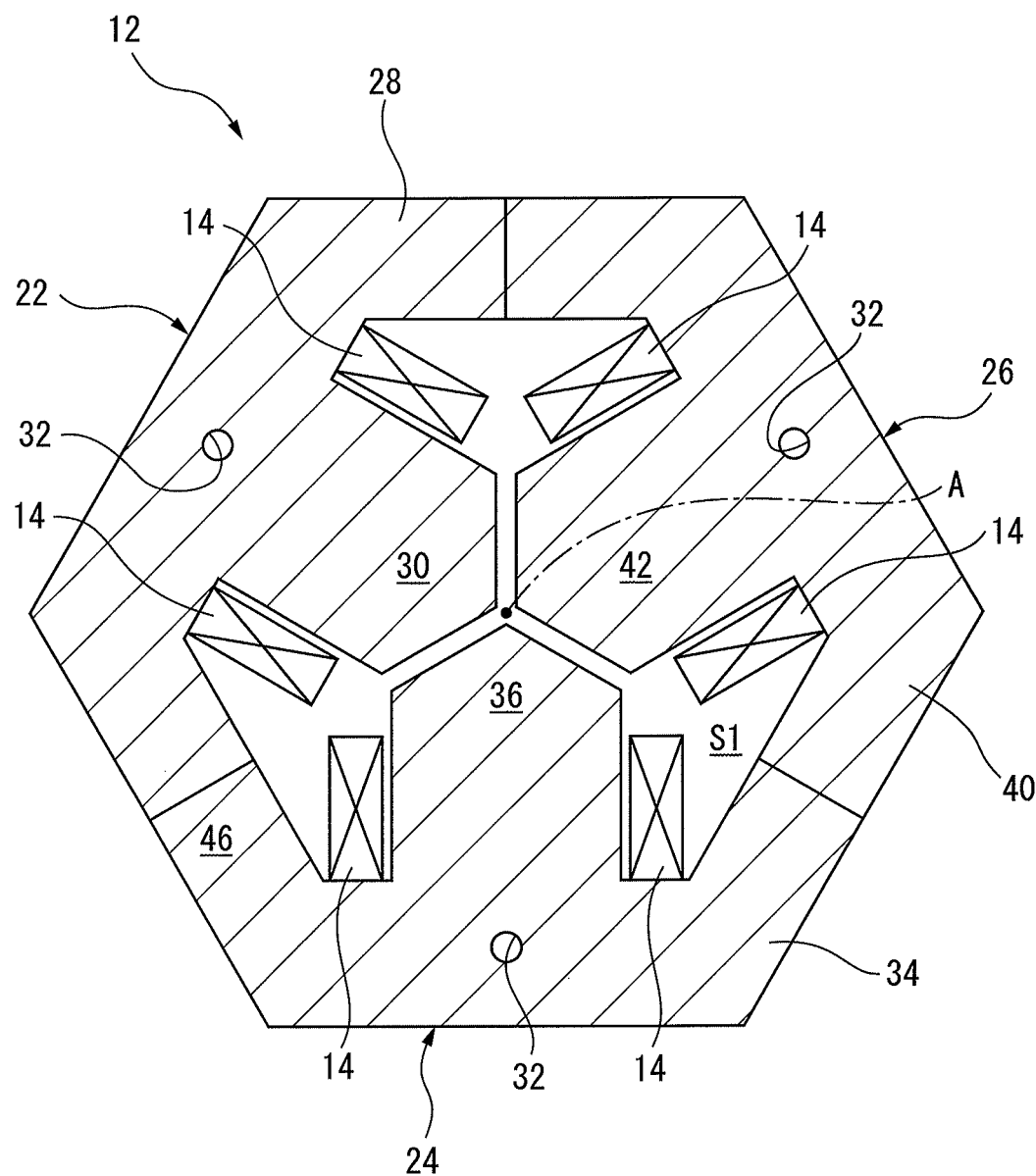
FIG. 3 is a cross-sectional view of the reactor shown in FIG. 2, cut along line III-III in FIG. 2.

The core segments 22, 24, and 26 have the same shape. Specifically, as shown in FIG. 3, the core segment 22 includes a back yoke segment 28 and a tooth 30 projecting radially inside from the back yoke segment 28.

Similarly, the core segment 24 includes a back yoke segment 34 and tooth 36 projecting radially inside from the back yoke segment 34. Similarly, the core segment 26 includes a back yoke segment 40 and a tooth 42 projecting radially inside from the back yoke segment 40.

The back yoke segments 28, 34, and 40 aligning in the circumferential direction constitute a tubular back yoke 46. The back yoke 46 has a hexagonal outer shape, and is centered about the axis A.

Note that, the outer shape of the back yoke 46 is not limited to the hexagonal shape, but may be a circular or polygonal shape. A total of three rod receiving holes 32 are formed at the back yoke 46 (at each of the back yoke segments 28, 34, and 40 in this embodiment).

The teeth 30, 36, and 42 are arranged in the circumferential direction at substantially equal intervals (i.e., 120°). The back yoke 46 and the teeth 30, 36, and 42 define an internal space S1 of the core 12. The coils 14 are wound around the respective teeth 30, 36, and 42. Thus, the coils 14 are installed inside of the core 12.

The terminal block 16 is attached to an axially upper end 48 (first end) of the core 12. The terminal block 16 includes a base 50 and a plurality of terminals 52 fixed to the axially upper side of the base 50.

The base 50 has a hexagonal outer shape substantially the same as the back yoke 46. The base 50 is formed with a plurality of communication holes 54 extending through the base 50 in the axial direction. The internal space S1 of the core 12 and the outside of the reactor 10 are in fluid communication with each other through the respective communication holes 54. Each terminal 52 is a conductor, and lead wires (not shown) of the coils 14 are connected to the respective terminals 52.

Figure 4:
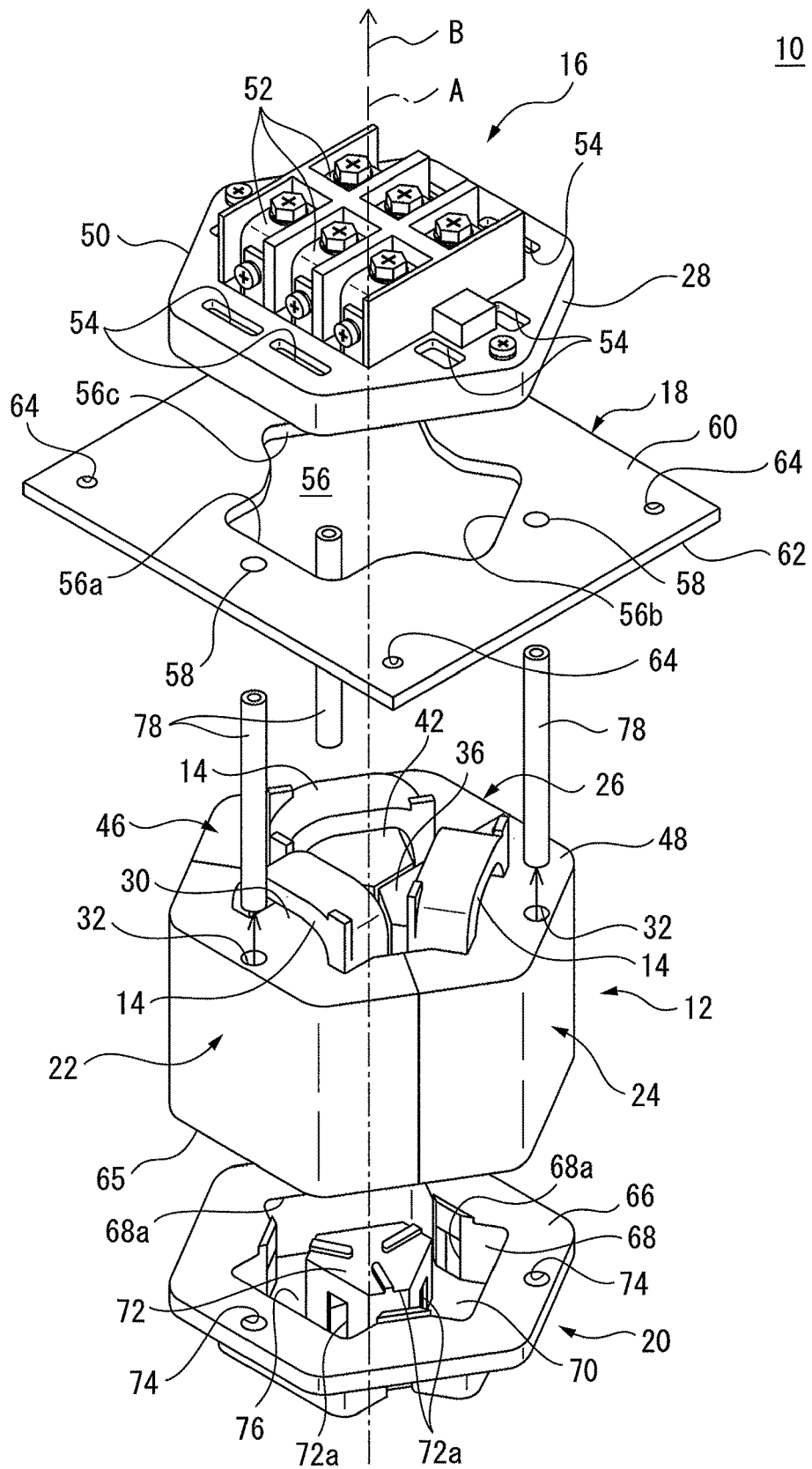
FIG. 4 is an exploded perspective view of the reactor shown in FIG. 1.

As shown in FIG. 4, the attachment flange 18 is a flat plate member separated from the core 12, and is formed with a through-hole 56 at its center part. The through-hole 56 is a tripod (tri-star) shaped hole, and includes a first hole 56a, a second hole 56b, and a third hole 56c extending radially outside from the axis A.

The first hole 56a, the second hole 56b, and the third hole 56c are respectively disposed at circumferential positions corresponding to teeth 30, 36, and 42 (i.e., at intervals of 120°).

The first hole 56a receives therein the axially upper-side coil end of the coil 14 wound around the tooth 30. The second hole 56b receives therein the axially upper-side coil end of the coil 14 wound around the tooth 36. Further, the third hole 56c receives therein the axially upper-side coil end of the coil 14 wound around the tooth 42.

The attachment flange 18 is formed with a total of three rod receiving holes 58. Note that, only two of the three rod receiving holes 58 are shown in FIG. 4. The rod receiving holes 58 are respectively in communication with the rod receiving holes 32 formed at the back yoke 46 of the core 12.

The attachment flange 18 has an axially upper end face 60 and an axially lower end face 62 opposite the end face 60.

The end faces 60 and 62 are parallel to each other, and arranged to be perpendicular to the axis A. Further, a plurality of mounting holes 64 are formed at the attachment flange 18.

The attachment flange 18 is held between the terminal block 16 and the core 12 so as to extend radially outside of the core 12. Thus, the attachment flange 18 is disposed at a position between an axially lower end 65 (second end) of the core 12 and the terminals 52. More specifically, the attachment flange 18 is spaced axially downward away from the terminals 52, and is disposed between the terminals 52 and the axially upper end 48 of the core 12.

The cover 20 is attached to the axially lower end 65 of the core 12 so as to cover the internal space S1 of the core 12 from the axially lower side. The cover 20 includes a base 66, a peripheral wall 68, a bottom wall 70, and a center wall 72.

The base 66 is an annular flat plate member having a hexagonal outer shape substantially the same as the back yoke 46 of the core 12, and arranged so as to be in surface-contact with the axially lower end 65 of the core 12. A total of three rod receiving holes 74 (FIG. 4) are formed at the base 66.

Note that, only two of the three rod receiving holes 74 are shown in FIG. 4. The rod receiving holes 74 are respectively in communication with the rod receiving holes 32 formed at the back yoke 46 of the core 12.

The peripheral wall 68 extends axially downward from the base 66, and extends along the wall surface defining the through-hole 56 formed at the attachment flange 18 so as to surround the axis A. The peripheral wall 68 is formed with communication holes 68a extending through the peripheral wall 68.

The bottom wall 70 is an annular flat plate member arranged to be parallel to the base 66, and is connected to the axially lower end of the peripheral wall 68. The bottom wall 70 extends so as to surround the axis A. The center wall 72 extends axially upward from a radially inner edge of the bottom wall 70.

The axially upper end face of the center wall 72 faces the axially lower end faces of the teeth 30, 36, and 42. The center wall 72 is formed with communication holes 72a extending through the center wall 72.

The peripheral wall 68, the bottom wall 70, and the center wall 72 define an annular recess 76 which is in fluid communication with the internal space S1 of the core 1. The annular recess 76 receives therein the axially lower coil ends of the coils 14 wound around the teeth 30, 36, and 42.

The recess 76 (i.e., the internal space S1 of the core 12) defined in the cover 20 and the outside of the reactor 10 are in fluid communication with each other through the communication holes 68a formed at the peripheral wall 68 and the communication holes 72a formed at the center wall 72.

As shown in FIG. 4, the reactor 10 further includes a total of three rods 78. Each rod 78 is inserted into the rod receiving holes 58, 32, and 74 which are in communication with each other.

The axially top ends of the rods 78 are fixed to the attachment flange 18, while the axially bottom ends of the rods 78 are fixed to the base 66 of the cover 20. Further, the terminal block 16 is fixed to the attachment flange 18 by fastening tools, such as bolts. In this way, the core 12, the terminal block 16, the attachment flange 18, and the cover 20 are integrally fixed to each another.

Figure 5:
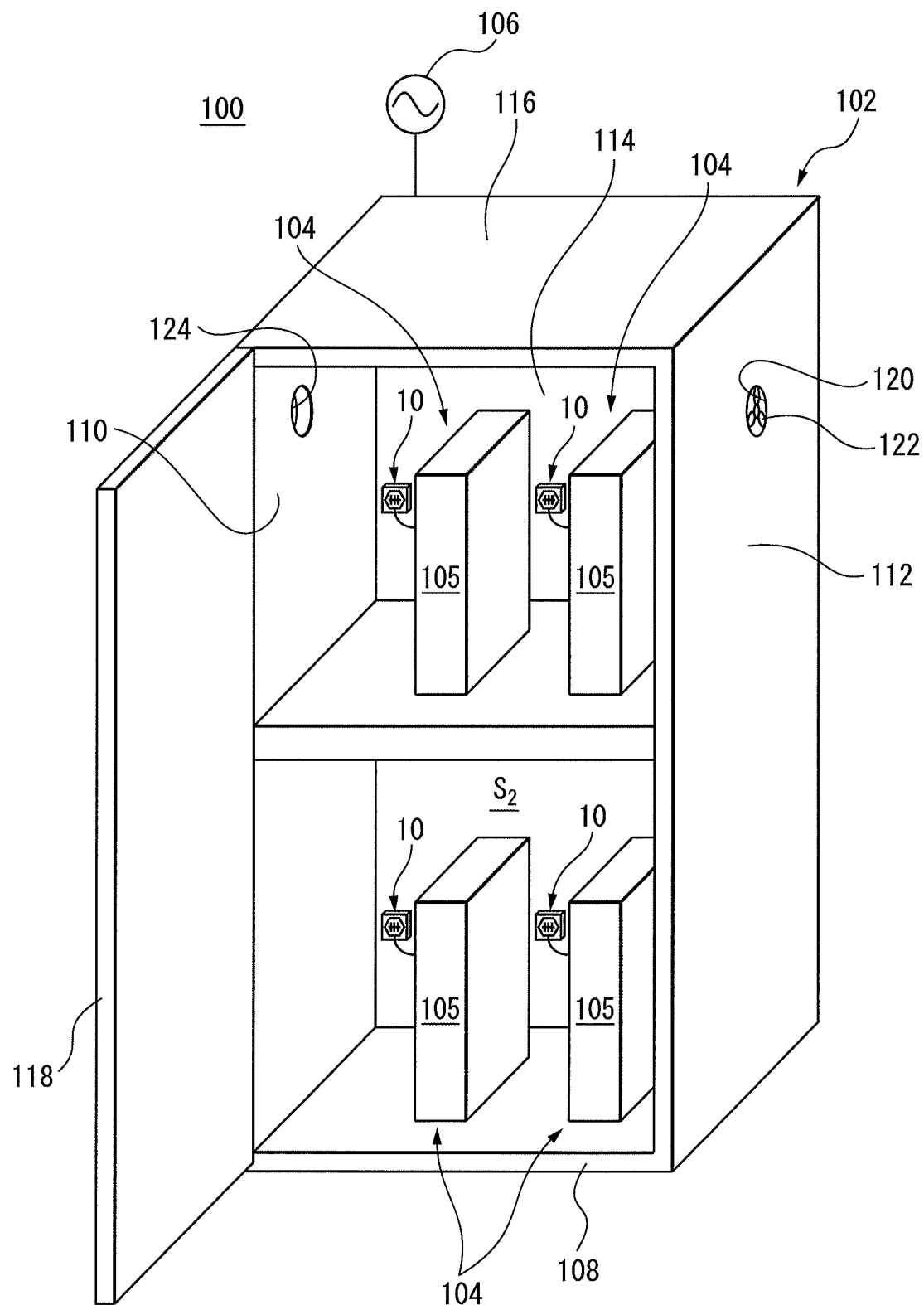
FIG. 5 is a perspective view of an amplifier device according to an embodiment.

Next, with reference to FIGS. 5 and 6, an amplifier device 100 according to an embodiment of the invention will be described. The amplifier device 100 includes a power cabinet 102 and a plurality of motor drive devices 104.

The power cabinet 102 is hollow, and includes a bottom wall 108, side walls 110 and 112, a rear wall 114, a top wall 116, and a door 118 pivotally supported by the side wall 110. The side walls 110 and 112 extend upward from both side edges of the bottom wall 108 so as to be opposite to each other.

The rear wall 114 extends upward from the rear edge of the bottom wall 108, and extends between the side walls 110 and 112. The top wall 116 is connected to the top ends of the side walls 110 and 112 and the top end of the rear wall 114. The bottom wall 108, the side walls 110 and 112, the rear wall 114, and the top wall 116 define an internal space S2 of the power cabinet 102.

The door 118 can open and close so as to open and close the internal space S2 to and from the outside of the power cabinet 102.

A suction hole 120 is formed at the side wall 112 so as to extend through the side wall 112. A fan 122 is installed in the suction hole 120. The fan 122 introduces the outside air from the outside of the power cabinet 102 into the internal space S2 through the suction hole 120, when the door 118 is closed. Due to this, the air pressure in the internal space S2 of the power cabinet 102 gets slightly higher than the outside air pressure of the outside of the power cabinet 102.

On the other hand, an exhaust hole 124 is formed at the side wall 110 so as to extend through the side wall 110. The air introduced into the internal space S2 by the fan 122 passes through the internal space S2, and then is discharged to the outside through the exhaust hole 124. By the air passing through the internal space S2 in this way, the components of the motor drive devices 104 disposed in the internal space S2 can be cooled.

In this embodiment, each motor drive device 104 supplies electric power to a motor built in e.g. a machine tool, an industrial machine, or a robot. Each motor drive device 104 includes a reactor 10 and a servo amplifier 105.

Figure 6:
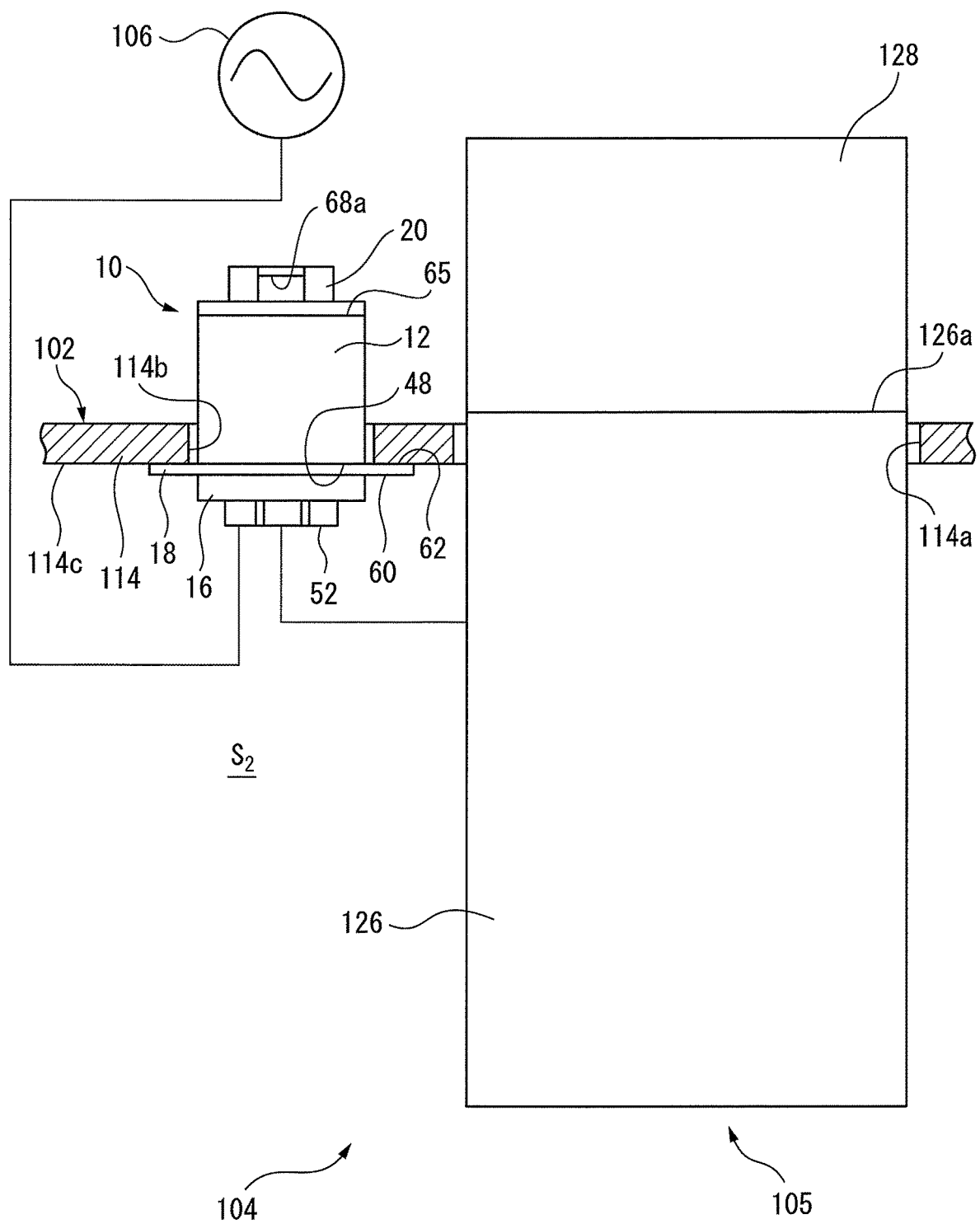
FIG. 6 is a cross-sectional view of the amplifier device shown in FIG. 5, in which a motor drive device and a power source are enlarged.

As shown in FIG. 6, each servo amplifier 105 includes a chassis 126, a heatsink 128 attached to a rear end 126a of the chassis 126, and a heat-generating element (not shown), such as a power element.

The heatsink 128 includes heat radiation fins (not shown), and the heat-generating element of the servo amplifier 105 is attached to the heatsink 128. As shown in FIG. 6, a through-hole 114a is formed at the rear wall 114 of the power cabinet 102. The heatsink 128 is exposed to the outside of the power cabinet 102 through the through-hole 114a, thereby the heatsink 128 of the servo amplifier 105 is disposed outside of the power cabinet 102.

A power source 106 is installed outside of the power cabinet 102. The power source 106 is e.g. an AC voltage source configured to supply alternating-current voltage to the motor drive devices 104.

The reactor 10 is installed between one servo amplifier 105 and the power source 106. For example, the reactor 10 reduces the peak current of regenerative current that is output from the servo amplifier 105.

Next, with reference to FIG. 6, an attachment structure of the reactor 10 to the power cabinet 102 will be described. A through-hole 114b is formed at the rear wall 114 of the power cabinet 102. The core 12 of the reactor 10 is inserted into the through-hole 114b, so that the terminal block 16 (i.e., the terminals 52) and the attachment flange 18 are located in the internal space S2 of the power cabinet 102.

On the other hand, the cover 20 and a major part of the core 12 including the end 65 are exposed to the outside of the power cabinet 102. The end face 60 of the attachment flange 18 faces the internal space S2, while the end face 62 of the attachment flange 18 is in surface-contact with an inner surface 114c of the rear wall 114.

In this state, bolts (not shown) are inserted to the respective mounting holes 64 formed at the attachment flange 18, and fastened to screw holes (not shown) formed at the rear wall 114. In this way, the attachment flange 18 is fixed to the rear wall 114, and thus, the reactor 10 is fixed to the rear wall 114 as shown in FIG. 6.

In the state shown in FIG. 6, the attachment flange 18 closes the through-hole 114b of the rear wall 114, and a major part of the core 12 and the coils 14 (FIGS. 3 and 4) is exposed to the outside of the power cabinet 102.

As described above, the air pressure of the internal space S2 of the power cabinet 102 is increased by the operation the fan 122 to be higher than the outside air pressure of the outside of the power cabinet 102. Therefore, the air in the internal space S2 flows into the internal space S1 of the core 12 through the communication holes 54 formed in the terminal block 16, and is discharged to the outside through the communication holes 68a and 72a formed in the cover 20.

As described above, in this embodiment, the reactor 10 can be fixed to the rear wall 114 by the attachment flange 18 as shown in FIG. 6. Due to this configuration, at least a part of each coil 14, which generates heat during the operation of the reactor 10, can be disposed outside of the power cabinet 102.

Thereby, since the amount of the heat generating elements located in the internal space S2 can be reduced, it is possible to reduce the quantity of heat to be generated in the internal space S2 during the operation of the amplifier device 100. Further, since at least a part of the core 12 can be exposed to the outside of the power cabinet 102, it is possible to cool the core 12 by the outside air.

Further, since the heat accumulated in the core 12 can be conducted to the rear wall 114 of the power cabinet 102 through the attachment flange 18, it is possible to effectively remove heat from the core 12. Further, the attachment flange 18 has a simpler structure, by which, the reactor 10 can be easily attached to the power cabinet 102 along with reducing the manufacturing cost.

Further, in this embodiment, the attachment flange 18 is disposed between the terminals 52 and the end 48 of the core 12. Due to this configuration, a major part of the core 12 and the coils 14 can be exposed to the outside of the power cabinet 102. Accordingly, it is possible to more-effectively reduce the quantity of heat to be generated in the internal space S2 during the operation of the amplifier device 100, along with more-effectively cooling the core 12 by the outside air.

Further, in this embodiment, an airflow, which flows into the internal space S1 of the core 12 through the communication holes 54 and then is discharged to the outside through the communication holes 68a and 72a of the cover 20, is generated when the air pressure in the internal space S2 is higher than the outside air pressure by the operation of the fan 122.

Due to this configuration, it is possible to effectively cool the core 12 and the coils 14 by the airflow passing through the internal space S1. Thus, the core 12 and the coils 14 can be effectively cooled from both inside and outside of the core 12. Further, it is possible to prevent foreign substances, such as cutting fluid, located outside of the power cabinet 102 from entering the internal space S1 of the core 12 through the communication holes 68a and 72a and from being brought into contact with the coils 14. Thus, the coils 14 can be prevented from deteriorating due to such foreign substances.

Figure 7:
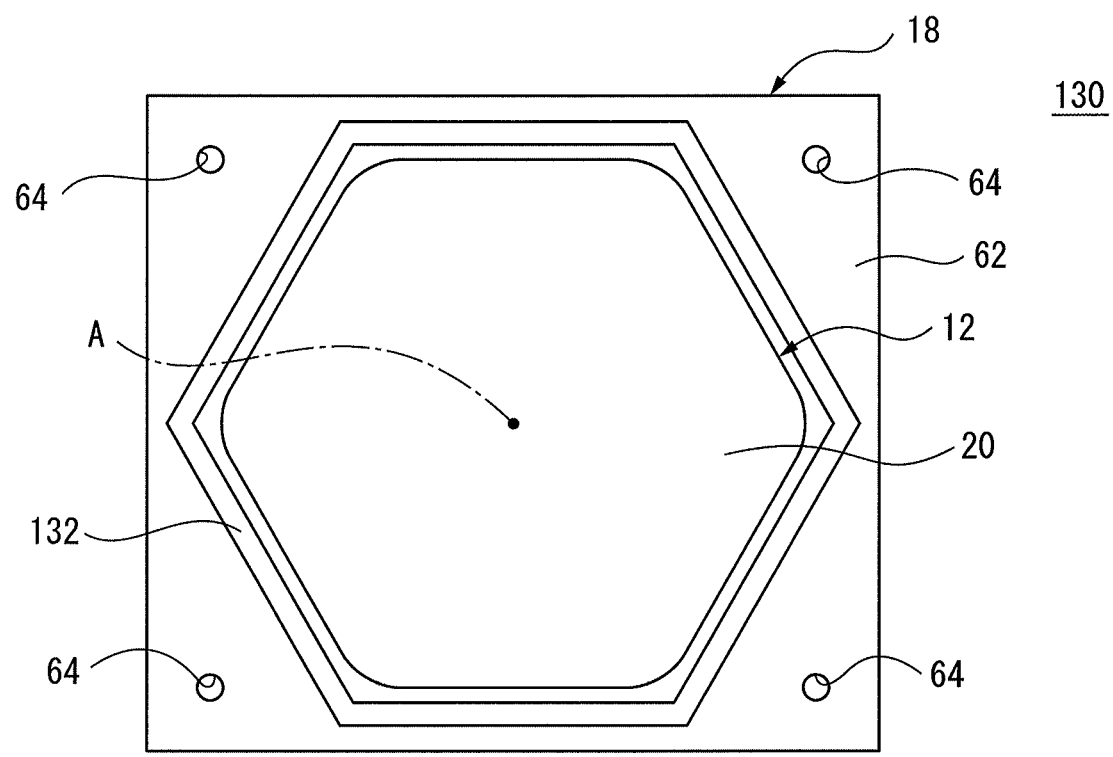
FIG. 7 is a bottom view of a reactor according to another embodiment.

Next, with reference to FIGS. 7 and 8, a reactor 130 according to another embodiment will be described. FIG. 7 is a view of the reactor 130 when seen from the axially lower side (i.e., the lower side in FIGS. 1 and 2).

The reactor 130 is different from the above-mentioned reactor 10 in the configuration wherein the reactor 130 further includes a seal 132. The seal 132 is provided on the axially lower end face 62 of the attachment flange 18 so as to surround the core 12. The seal 132 is comprised of e.g. an adhesive agent or an adhesive tape.

Figure 8:
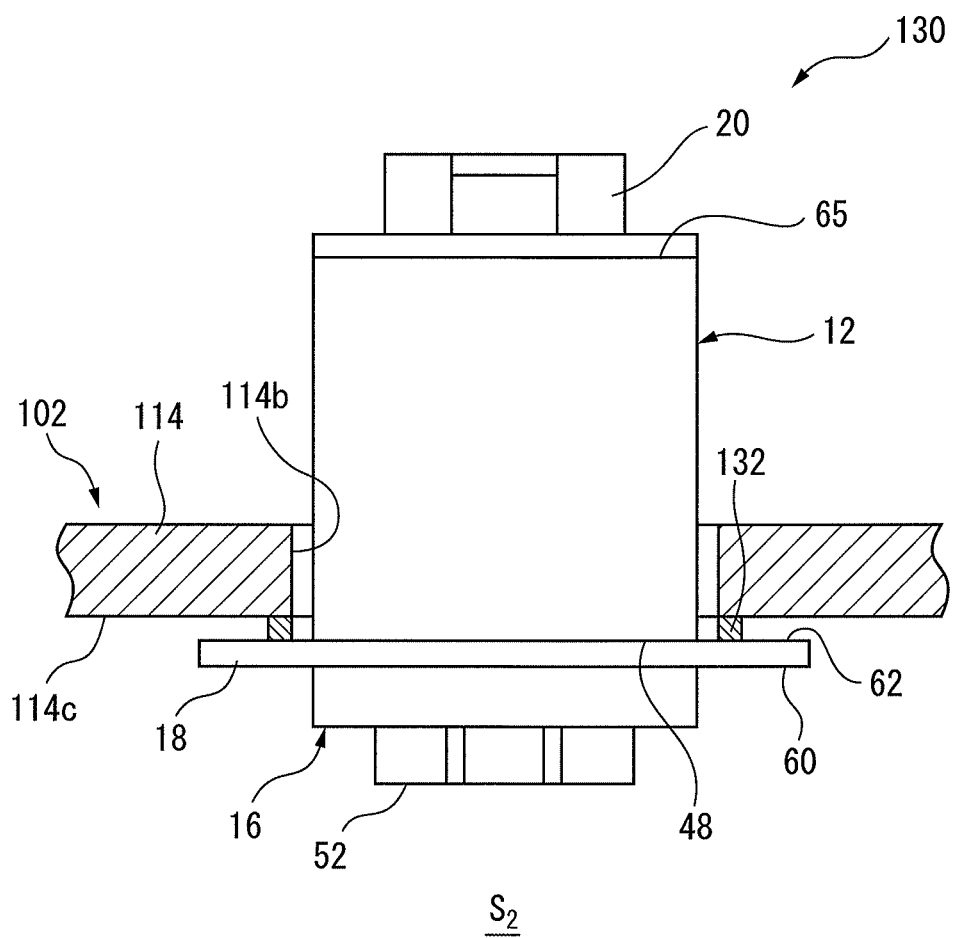
FIG. 8 is a cross-sectional view of the reactor shown in FIG. 7, in which the reactor is attached to a power cabinet.

When the reactor 130 is fixed to the rear wall 114 as shown in FIG. 8, the seal 132 is interposed between the rear wall 114 and the attachment flange 18 so as to hermetically seal the through-hole 114b of the rear wall 114. As seen above, the core 12 of the reactor 130 has a tubular shape, by which, a hermetically sealing by the seal 132 can be easily implemented. Thereby, it is possible to reliably prevent foreign substances located outside of the power cabinet 102 from entering the internal space S2 through the through-hole 114b.

Figure 9:
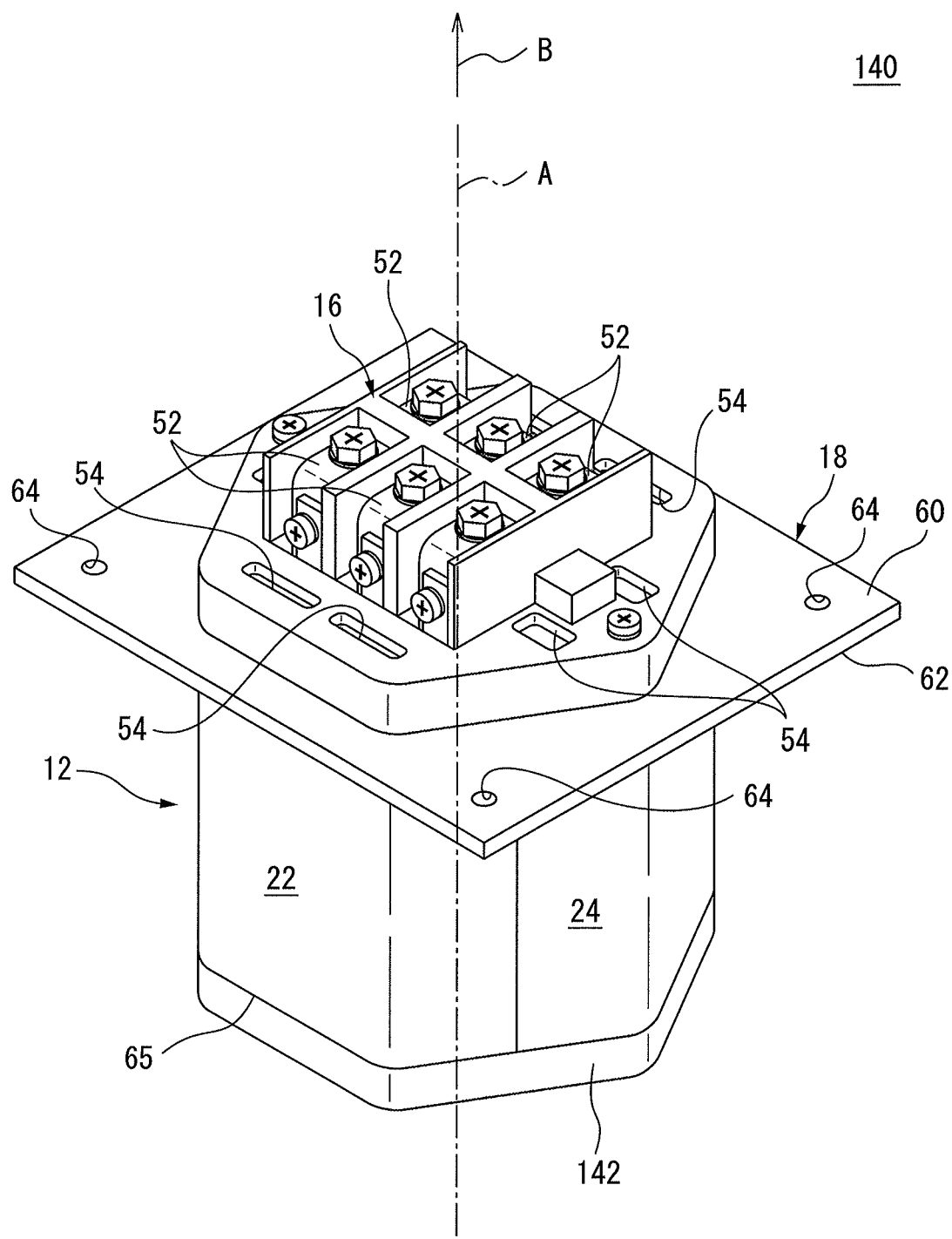
FIG. 9 is a perspective view of a reactor according to still another embodiment.

Next, with reference to FIG. 9, a reactor 140 according to still another embodiment will be described. The reactor 140 is different from the reactor 10 in the configuration wherein the reactor 140 includes a sealing section 142 in place of the cover 20.

The sealing section 142 is attached to the axially lower end 65 of the core 12 so as to cover the internal space S1 of the core 12 from the axially lower side to hermetically seal the internal space S1 from the outside.

Due to this configuration, it is reliably prevent foreign substances located outside of the power cabinet 102 from entering the internal space S1.

Figure 10:
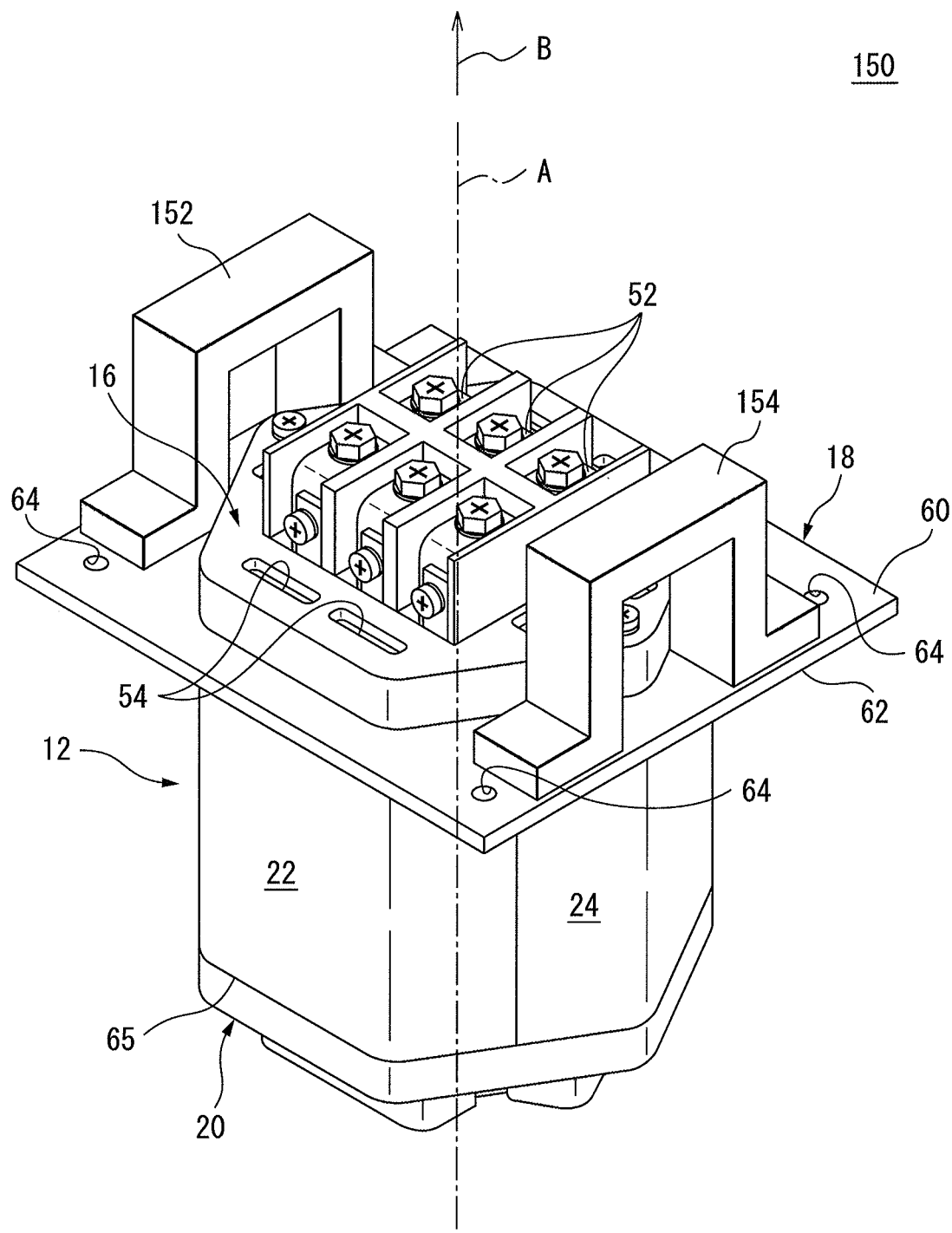
FIG. 10 is a perspective view of a reactor according to still another embodiment.

Next, with reference to FIG. 10, a reactor 150 according to still another embodiment will be described. The reactor 150 is different from the reactor 10 in the configuration wherein the reactor 150 further includes handles 152 and 154.

The handles 152 and 154 are fixed to the axially upper end face 60 of the attachment flange 18 so as to project axially upward from the end face 60. The handles 152 and 154 may be fixed to the end face 60 by e.g. an adhesive agent, welding, or screw clamp. In this embodiment, the handle 152 and the handle 154 are fixed to the end face 60 so that the terminal block 16 is disposed therebetween.

A user grasps the handles 152 and 154 when moving the reactor 150. The user can easily lift and move the reactor 150 using the handles 152 and 154.

Figure 11:
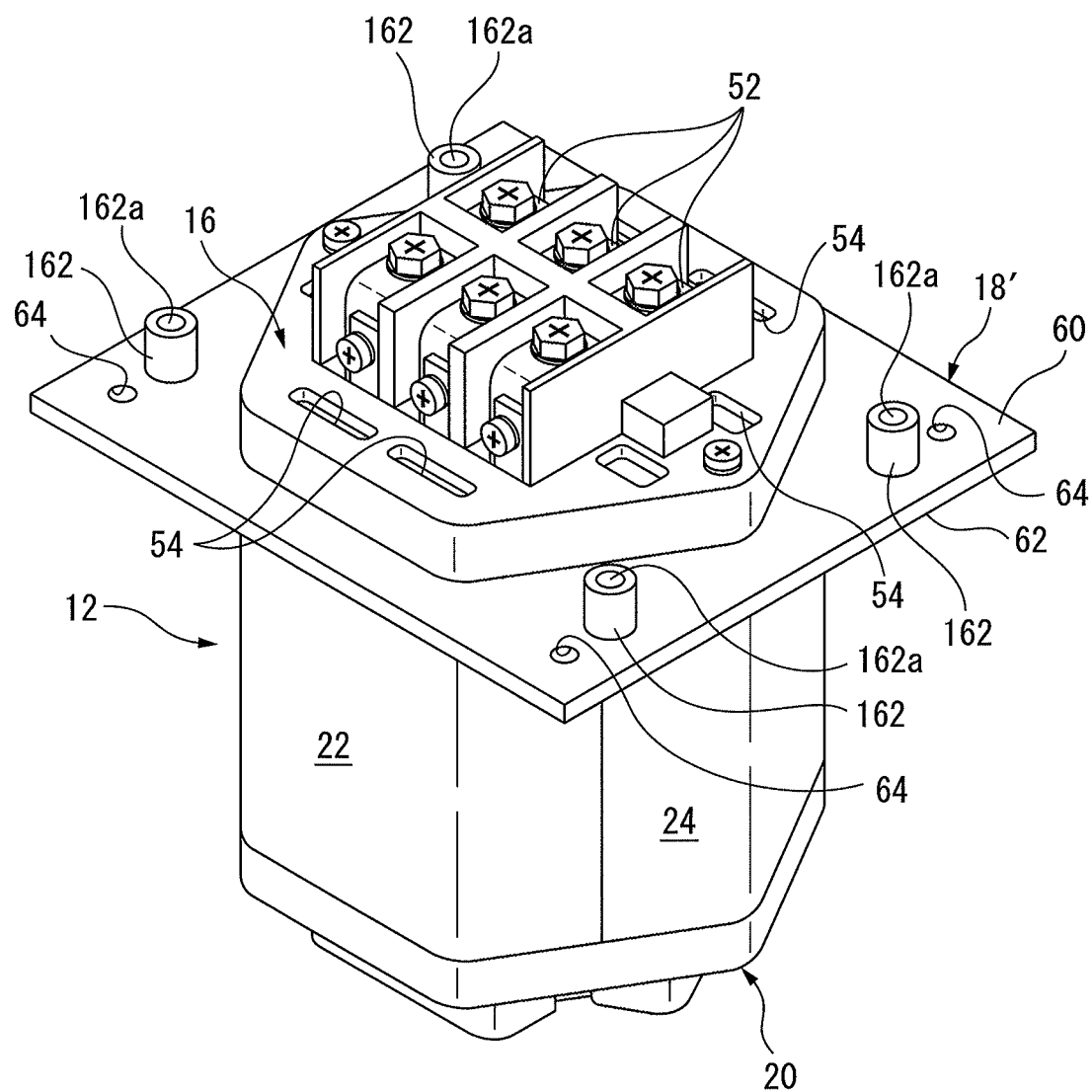
FIG. 11 is a perspective view of a reactor according to still another embodiment.

Next, with reference to FIG. 11, a reactor 160 according to still another embodiment will be described. The reactor 160 is different from the reactor 10 in the configuration of the attachment flange 18'. Specifically, the attachment flange 18' according to this embodiment is provided with a plurality of bosses 162.

The bosses 162 are formed integrally with the axially upper end face 60 of the attachment flange 18' so as to project axially upward from the end face 60. A screw hole 162a is formed at each boss 162. Eyebolts (not shown) can be fastened to the respective screw holes 162a. Thus, each screw hole 162a functions as a fastening section for fastening the eyebolt.

When lifting up the reactor 160 by a lifting machine, the eyebolts fastened to the screw holes 162a are engaged with hooks of the lifting machine. By the eyebolts, it is possible to lift up and transport the reactor 160 by the lifting machine even when the reactor 160 is heavy in weight.

Note that, in the above-mentioned embodiments, the attachment flange 18, 18' is disposed between the terminal block 16 and the core 12. However, the attachment flange may be disposed between the end 48 and the end 65 of the core 12.

As an example, the attachment flange includes a through-hole at its center, wherein the through-hole has an outer shape substantially the same as the core 12 (i.e., hexagonal shape in the embodiment shown in FIG. 1). In this case, the attachment flange may be fixed to the outer peripheral surface of the core 12 by e.g. welding or bonding, in a condition where the core 12 is inserted into the through-hole.

Thereby, the attachment flange is fixed to the outer peripheral surface of the core 12 at a position between the end 48 and the end 65, so as to extend radially outside from the outer peripheral surface of the core 12 and extend over the entire circumference of the core 12 to surround it.

In this case, the attachment flange may be disposed at a position between the first end 48 and the second end 65 to be closer to the first end 48 than the second end 65. According to this configuration, a major part of the core 12 and the coils 14 can be exposed to the outside of the power cabinet 102.

Further, in the above-mentioned, the attachment flange 18, 18' is a member separate from the core 12, which is attached to the core 12. However, the attachment flange 18, 18' may be formed integrally with the core 12 or the terminal block 16.

Further, in the above-mentioned embodiments, the attachment flange 18, 18' is disposed in the internal space S2 of the power cabinet 102. However, the attachment flange 18, 18' may be disposed outside of the power cabinet 102. In this case, the attachment flange 18, 18' is fixed to the outer surface of the rear wall 114 so that the end face 60 of the attachment flange 18, 18' is in surface-contact with the outer surface of the rear wall 114.

Further, the attachment flange 18, 18' may be disposed at any position in the axial direction of the core 12. Further, the back yoke 46 of the core 12 may have a cylindrical shape or any tubular outer shape.

Although the invention has been described above through various embodiments, the embodiments do not limit the inventions according to the claims. Further, a configuration obtained by combining the features described in the embodiments of the invention can be included in the technical scope of the invention. However, all combinations of these features are not necessarily essential for solving means of the invention. Furthermore, it is obvious for a person skilled in the art that various modifications or improvements can be applied to the embodiments.

The invention claimed is:

1. A reactor comprising:
a tubular core including a plurality of core segments arranged to align in a circumferential direction;
a coil provided in the core;
a terminal provided at an first end of the core in an axial direction, the coil being connected to the terminal; and
an attachment flange fixed to an outer peripheral surface of the core and extending radially outside the outer peripheral surface of the core, wherein the attachment flange is disposed at a position between the terminal and a second end of the core opposite the first end, and wherein the attachment flange has a larger surface in the radial direction with respect to an entire outer circumference of the core.

2. The reactor according to claim 1, wherein the attachment flange is disposed at a position between the terminal and the first end, or at a position between the first end and the second end to be closer to the first end than the second end.

3. A reactor according to claim 1, further comprising a sealing section provided at the second end so as to hermetically seal the inside of the core.

4. A reactor according to claim 1, further comprising a seal provided at an end face of the attachment flange in the axial direction so as to surround an outer surface of the core.

5. A reactor according to claim 1, wherein the attachment flange is formed with:
- a handle provided so as to project from the attachment flange in the axial direction; or
- a fastening section for fastening an eyebolt.

* * * * *